Figure 9:
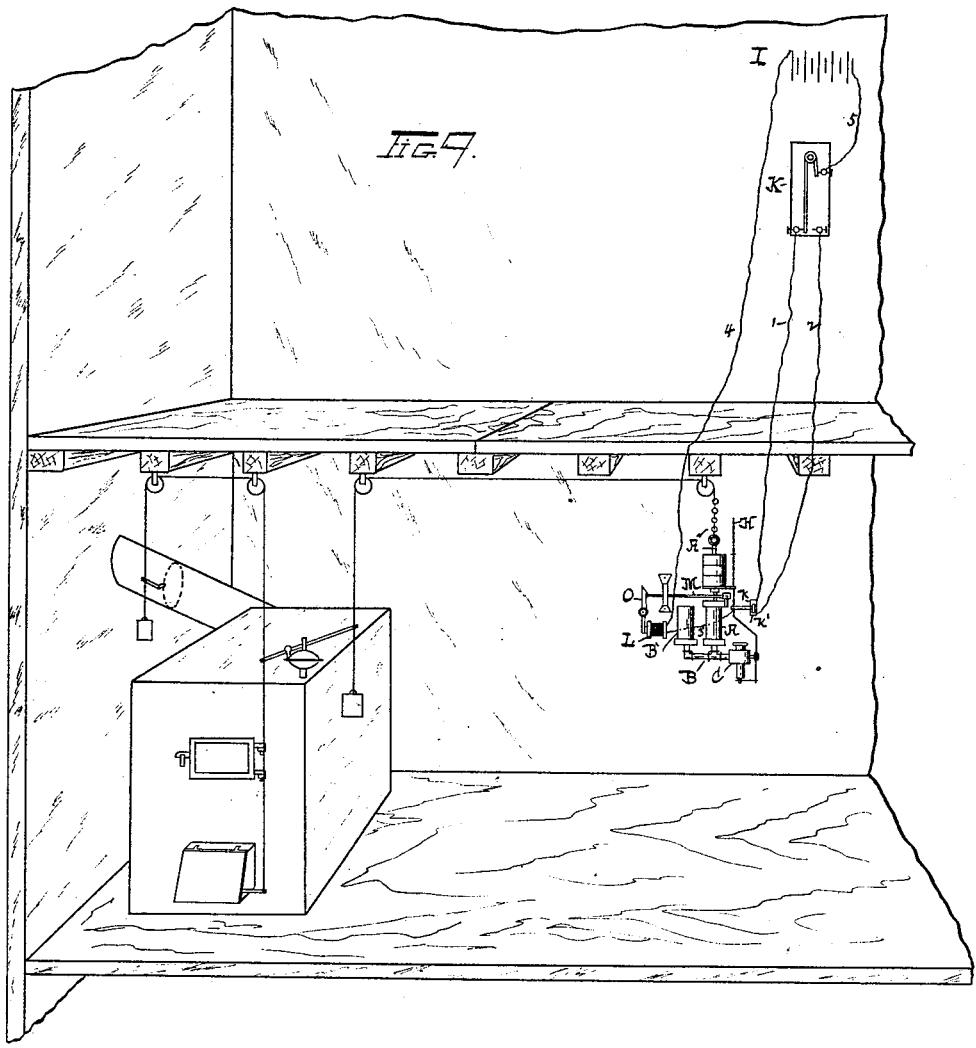

(No Model.) 3 Sheets—Sheet 1.
C. W. JOHNSON.
TEMPERATURE REGULATOR.
No. 386,828. Patented July 31, 1888.
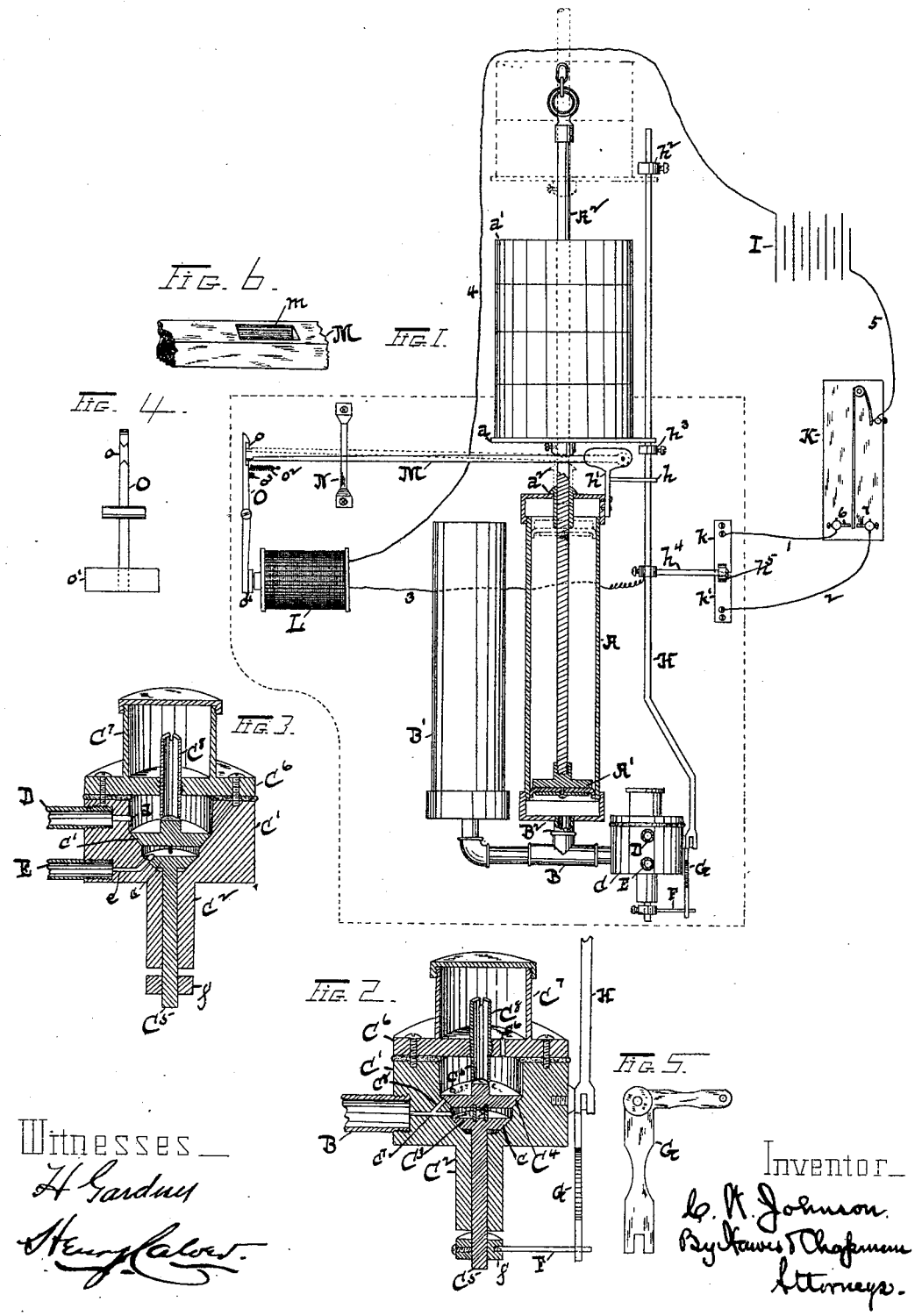

(No Model.)  3 Sheets—Sheet 2.
C. W. JOHNSON.
TEMPERATURE REGULATOR.
No. 386,828.  Patented July 31, 1888.
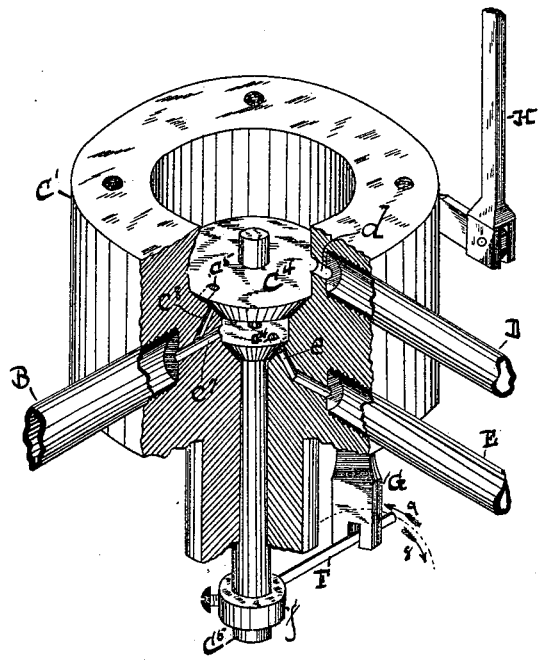
Fig. 7.
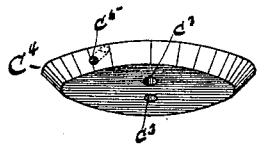
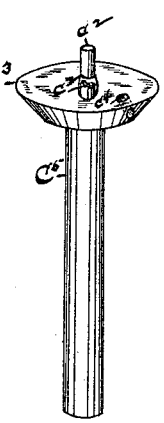
Fig. 8.
Witnesses
H. Gardner
Henry Calvert
Inventor
C. W. Johnson
By Hawes & Chapman
Attorneys.

(No Model.) 3 Sheets—Sheet 3.
C. W. JOHNSON.
TEMPERATURE REGULATOR.

No. 386,828. Patented July 31, 1888.

Witnesses
H. Gardner
F. L. Tuttle

Inventor
C. W. Johnson,
By Hawes & Chapman
Attorneys

United States Patent Office.

CHARLES W. JOHNSON, OF HOLYOKE, MASSACHUSETTS.

TEMPERATURE-REGULATOR.

SPECIFICATION forming part of Letters Patent No. 386,828, dated July 31, 1888.

Application filed December 27, 1887. Serial No. 259,122. (No model.)

*To all whom it may concern:*

Be it known that I, CHARLES W. JOHNSON, of Holyoke, in the county of Hampden and Commonwealth of Massachusetts, have invented a new and useful Improvement in Apparatus for Regulating Temperature, of which the following is a specification, reference being had to the accompanying drawings, forming part thereof.

My invention relates to apparatus for regulating temperature, in which the dampers and draft-openings of a furnace are automatically opened and closed by means of suitable electrical connections with a thermostat; and it relates especially to the form of such apparatus shown and described in Letters Patent No. 359,392, issued to me on the 15th day of March, A. D. 1887. The apparatus shown and described in said Letters Patent comprises a vertically-disposed cylinder containing a piston, the stem of which piston passes through the upper head of the cylinder and carries at its upper end a weight, which weight is so connected by means of cords or chains with the dampers and draft-openings of a furnace that as said piston ascends within the cylinder said dampers and draft-openings are opened, and as it descends they are closed. A slide-valve governs the admission of liquid under pressure to and its exhaustion from said cylinder, the stem of said valve being drawn in opposite directions by magnets located adjacent to each end of said stem and armatures mounted upon said stem, as the circuit is made and broken through said magnets alternately by means of a thermostat. While said apparatus is perfect in its operation to automatically regulate the temperature of the apartment in which the thermostat is located, it is the object of my present invention to improve its construction by simplifying certain portions thereof and combining therewith certain novel features, by which I am enabled to dispense with one of the sets of magnets and to utilize the liquid under pressure and the action of gravity as the direct agents for operating the valve, thereby avoiding any possible failure of the operation of the valve through an insufficient or interrupted electrical current.

To this end my invention consists in the apparatus hereinafter fully described, and particularly pointed out in the claims.

Referring to the drawings, in which like letters designate like parts in the several figures, Figure 1 is a front view, partly in section, of the apparatus and its connection with the battery and thermostat. Fig. 2 is a vertical central sectional view of the valve governing the admission of liquid under pressure to and its exhaustion from the cylinder. Fig. 3 is a similar view of said valve, the section, however, being taken upon a line perpendicular to the line upon which the section in Fig. 2 is taken. Fig. 4 is a detail view of the pawl which engages the end of the trip-lever. Fig. 5 is a similar view of the lever which transmits motion from the tappet-rod to the valve-spindle. Fig. 6 is a perspective view of a portion of the trip-lever. Fig. 7 is a perspective view of the valve, with substantially one-fourth of its shell broken out to show the interior thereof. Fig. 8 is perspective view of the valve-disks and their spindle or stem. Fig. 9 illustrates the operation of the regulating apparatus in connection with the heat-generator of a building.

The letter A designates a cylinder having a piston, A', closely fitted to its bore, the stem $A^2$ of which passes through the upper head of the cylinder and is provided at its upper end with means for connecting thereto the chain or cord which operates the dampers and draft-openings of a furnace, as shown in Fig. 9. These parts are constructed and operate substantially in the manner shown and described in my said Letters Patent, and it will be understood that an upward movement of the piston A' will open the dampers and draft-openings of the furnace, while a downward movement thereof will close said dampers and openings. The piston is moved upwardly by the pressure of water or other liquid admitted to the cylinder at its lower end, and descends by the force of gravity, as in my said previous apparatus; but, instead of expediting its descent by means of a single weight secured to the stem of the piston, as therein shown, I prefer to secure a tray, $a$, to said stem, as shown, to receive weights $a'$, whereby I am enabled to increase and decrease the number of weights at will. The guide-bushing $a^2$, in the upper head of the cylinder through which the stem $A^2$ passes, instead of being rigidly secured within said head, as in my former apparatus, is capable of a limited vertical movement, for a purpose hereinafter described.

Having thus pointed out the parts of the apparatus which are common to the invention described in my said Letters Patent and to my present invention, I will now proceed to describe the parts which especially constitute the present invention.

The letter B designates a pipe, which communicates at one end with a closed air-chamber, B', at its opposite end with a valve, C, and between its ends by means of a branch pipe, B², with the interior of cylinder A below piston A', as shown in Fig. 1. Said pipe B forms the inlet and outlet passage by which water or other liquid under pressure is admitted to and exhausted from both cylinder A and air-chamber B', and the movement of the liquid in either direction through said pipe is governed by the valve C. This valve consists of a shell, C', preferably circular in cross-section, as shown, and having the downwardly-extending central projection, C², which shell is bored centrally to receive the valve-stem, and is counterbored to form an outer and inner chamber. The bottom of the inner chamber is formed into an annular inclined seat, $c$, and the bottom of the outer chamber, which is of a slightly-greater diameter than the inner chamber, is formed into a similar annular inclined seat, $c'$. Fitted to said seats $c\ c'$ are two disks, C³ C⁴, the former being integral with or rigidly secured to a stem, C⁵, extending downwardly through the bore of the projection C² of the shell. In order to provide for a slight tilting movement of the upper disk, C⁴, independently of disk C³, and at the same time prevent any independent rotary movement thereof, I provide the disk C³ with two pins, $c^2$, projecting from its upper face, and provide the disk C⁴ with two orifices, $c^3$, in its lower surface to receive the ends of said pins. (See Fig. 8.) The object of the slight independent tilting movement thus secured is to enable the disks C³ C⁴ to independently adjust themselves to their seats, so as to make a tight joint therewith notwithstanding any slight inequalities in the angle of said seats, which may result from a defective counterboring of the shell.

The disk C³ is provided with a port or passage, $c^4$, extending diagonally from its beveled bearing-surface to its upper face, and disk C⁴ is provided with a similar port or passage, $c^5$, said ports occupying different vertical planes, for a purpose presently to be described. The shell C' is provided with a cap, C⁶, detachably secured thereto by screws, as shown, suitable packing being inserted between the shell and cap to insure a tight joint between them. Upon cap C⁶ is located an oil-chamber, C⁷, having a removable cover, and an oil-conducting tube, C⁸, seated in said cap, projects at its upper end into said oil-chamber and has its lower end extended into the outer chamber of the shell to a point slightly above a central hub or projection on the upper surface of disk C⁴, whereby said tube also serves as a stop to prevent a bodily vertical movement of said disk. I also prefer to provide an additional passage, $c^6$, between said oil-chamber and the valve-chamber, whereby the water or other liquid with which the outer chamber of the valve is constantly filled, as hereinafter described, can rise within the oil-chamber and retain the lubricant in the upper portion of the latter, where it can enter tube C⁸. By such construction of the oil-chamber and oil-conducting tube the bearing-surfaces of both disks and their seats are constantly lubricated in such manner as to permit the former to have a free rotary movement within the latter.

As previously stated, one end of pipe B communicates with valve C, and such communication is established, as shown in Figs 2 and 7, by counterboring the shell C' to receive the end of said pipe and connecting said counterbore with the inner chamber of the valve at a point slightly above the upper surface of the lower disk by means of a duct, $c^7$, and with the seat of the upper disk by means of a branch duct, $c^8$. By such arrangement of said ducts said pipe B is adapted to be in constant open communication with the inner chamber of the valve, while its communication with the outer chamber thereof can be opened and closed by rotating disk C⁴ in such manner as to move its port $c^5$ into and out of alignment with the branch duct $c^8$. Two additional pipes communicate with valve C, preferably at a point distant from pipe B equal to one-fourth of the circumference of the shell C', as shown, the upper of which pipes (designated by the letter D) is connected by a duct, $d$, with the outer chamber of the valve above disk C⁴, and the lower one of which pipes (designated by the letter E) is connected with the seat of the lower disk, C³, by a duct, $e$, whereby said pipe D is adapted to be in constant open communication with the outer chamber of the valve, whereas pipe E communicates with the inner chamber thereof only when by the rotation of disk C³ its port $c^4$ is brought into alignment with duct $e$.

The pipe D is the supply-pipe for the liquid under pressure, by which piston A' is moved upwardly within cylinder A, and, while other liquids than water or air or other fluid can be employed in connection with any of the well-known means for mechanically creating pressure thereon, I prefer, whenever it is practicable, to connect pipe D with the ordinary street water-main, and thus utilize the pressure existing upon the water therein and avoid the additional expense attending the use of means for mechanically producing such pressure.

The pipe E is a waste-pipe, and may connect with a sewer or other medium for disposing of the waste water.

The ports $c^4\ c^5$ in the disks C³ C⁴, respectively, are so located relatively to the ducts communicating with the seats of said disks that when port $c^4$ in the lower disk is in alignment with duct e port $c^5$ in the upper disk will be out of alignment with duct $c^3$, and vice versa, and that a slight rotary movement of the disks in unison will suffice to bring either of said ports into alignment with its duct. From such arrangement of said pipes, ducts, and ports it follows that when the disks $C^3$ $C^4$ are in the position shown in Fig. 2 the water will pass from pipe D through the outer chamber of the valve and through port $c^5$, branch duct $c^3$, duct $c^7$, and pipe B into cylinder A and air-chamber B', raising the piston within the former and compressing the air within the latter. It also follows that when the position of said disks is changed from that shown in Fig. 2 to that shown in Figs. 3 and 7 the passage of the supply-stream of water beyond the outer chamber of the valve will be cut off, and that the water in the cylinder and air-chamber will exhaust back through pipe B, duct $c^7$, port $c^4$, duct e, and pipe E.

It now remains for me to describe the means by which the rotary movement of the valve-disks to accomplish the result just described is effected automatically, and also the means by which such automatic operation is governed and controlled by the increase and decrease in the degree of temperature through the medium of a thermostat.

The letter F designates an arm adjustably secured to the valve-stem $C^5$ by means of a collar, f, as shown, and G designates an elbow-lever pivoted upon the shell C' and having its vertical arm forked to receive the end of said arm F. (See Figs. 5 and 7.) The horizontal arm of said elbow-lever is connected by a pivot-joint to the lower end of a tappet-rod, H, which extends upwardly through a guide, h, projecting from a bracket, h', secured to the cylinder at its upper end, said rod having adjustably secured thereon the tappets $h^2$ $h^3$. A contact device projecting from the piston-stem $A^2$ is adapted to engage one of the tappets on said rod at either end of the movement of said stem, and I prefer to utilize the tray a as such contact device by continuing a portion thereof to a point adjacent to the rod and between the tappets, as shown.

The parts just described are so arranged that when the tray a in the downward movement of the piston stem is brought into contact with the tappet $h^3$ a very slight continuation of such downward movement will, through rod H, lever G, arm F, and stem $C^5$, rotate the valve-disks sufficiently to bring them to the position shown in Fig. 2 and permit the water to enter the cylinder and air-chamber, as previously described, and that when by the upward movement of the piston stem the said tray is brought into contact with tappet $h^2$ a very slight continuation of said upward movement will, through the same parts, rotate said disks in the opposite direction sufficiently to bring them to the position shown in Figs. 3 and 7 and permit the water to exhaust from the cylinder and air-chamber. Such automatic operation of the apparatus would continue indefinitely, alternately opening and closing the dampers and draft-openings of the furnace, but for the means for electrically controlling the same by means of a thermostat, now to be described.

The letter I designates an electric battery, which may be located at any convenient point in the building, and K designates the thermostat, which is or may be of the ordinary form, and which will be located at any desired point in the apartment or apartments heated from the furnace. One of the contact-points of the thermostat is connected by wire 1 with a metallic contact-plate, k, suitably secured in a position adjacent to the tappet-rod, and the opposite contact-point is connected by a wire, 2, with a similar contact-plate, k', separated from plate k by a narrow open space, as shown. An arm, $h^4$, adjustably secured to the tappet-rod, as shown, has its outer end located in front of and adjacent to said plates k k', and journaled upon said arm is a roll, $h^5$, bearing upon said plates and traveling from one to the other as the tappet-rod is moved in either direction.

The letter L designates an electro-magnet, which is connected by wire 3 with the tappet-rod, as shown, or with any portion of the apparatus, and by wire 4 with the battery. An additional wire, 5, connects the battery with the combined steel and rubber rod of the thermostat. Provision is thus made for two independent circuits, as the rod of the thermostat is in contact with one or the other of the contact-points thereon, either of which circuits is adapted to be broken by the movement of roll $h^5$ from one of the plates k k' to the other.

The letter M designates a trip-lever pivoted at its rear end to the bracket h', and having a slot, m, therein (see Fig. 6) of sufficient width to loosely receive the piston-stem, which passes through said lever, as shown. The front end of said trip-lever is guided by a guide, N, in such manner as to permit movement of the lever about its pivot as a center and in a vertical plane, while it is prevented from lateral movement. A pawl, O, pivoted near its center, is provided near its upper end with a notch, o, adapted to receive the end of said trip-lever, and at its lower end with an armature, o'. Said pawl is so located that when armature o' is in engagement with magnet L the upper end of said pawl will lie without the path of movement of the front end of the trip-lever, and that when its upper end is moved within the path of said end of the trip-lever, so that the latter is received within notch o, armature o' will be disengaged from but still within the field of said magnet. A spring, $o^2$, serves to normally retain the pawl in position to engage the end of the trip-lever, and a stop, $o^3$, serves to limit the movement of the pawl by said spring.

A stop is located upon piston-stem $A^2$ above the trip-lever, said stop preferably consisting of the hub of tray a, as shown, and the vertically-movable guide-bushing $a^2$, previously described, serves as a stop beneath said lever to limit the upward movement of the piston. The arrangement of said stops and tappets $h^2$ $h^3$ on the tappet-rod relatively to the trip-lever and its pawl is such that when the trip-lever is in engagement with the lower end wall of notch $o$, the hub of tray $a$ resting upon said lever and said tray slightly above tappet $h^3$, the piston will be held at a point slightly above the bottom of the cylinder, as shown by full lines in Fig. 1, and when said lever is in engagement with the upper end wall of said notch, the guide bushing $a^2$ bearing against the lower side of said lever and tray $a$ slightly below the tappet $h^2$, the piston will be held slightly below the upper end of the cylinder, as shown by broken lines in said figure.

The operation of the apparatus and its controlling mechanism is as follows: Supposing the parts to be in the position shown by full lines in Fig. 1, with the dampers and draft-openings of the furnace closed, the rod of the thermostat midway between the contact points 6 7 thereon, and valve C in the position shown in Figs. 3 and 7, said parts will remain in such position until by the decreasing temperature in the apartment containing the thermostat the rod of the thermostat is caused to contract and its lower end is moved into contact with point 6 thereon, whereupon the circuit being established through wire 1, plate $k$, arm $h^4$, and wires 3 and 4, armature $o'$ is drawn toward the magnet and the trip-lever is released from the pawl, permitting the piston to descend by gravity the short distance which separates it from the bottom of the cylinder. Such movement of the piston causes tray $a$ by its contact with tappet $h^3$ to depress the tappet-rod sufficiently to rotate the valve-disks in the direction indicated by arrow 9 in Fig. 7 and move port $c^4$ out of alignment with duct $e$ and port $c^5$ into alignment with branch duct $c^8$. As previously described, such movement of the valve permits the water to enter pipe B, from whence it passes into the cylinder, raising the piston therein, and also into air-chamber B', compressing the air in the latter. As the piston approaches the top of the cylinder, it strikes guide-bushing $a^2$ and moves it and the trip-lever upwardly until the end of the latter enters the notch in pawl O and is engaged by the upper end wall of said notch, whereby the upward movement of the piston is arrested. The depression of the tappet-rod, as just described, causes roll $h^5$ to pass from plate $k$ to plate $k'$, whereby the circuit described is broken, and spring $o^2$ restores the pawl O to its normal position, where it is ready to engage the end of the trip-lever, as described. The upward movement of the piston having opened the dampers and draft-openings of the furnace, the parts will remain in the position last described, and as shown by broken lines in Fig. 1, until the higher temperature causes the rod of the thermostat to be brought against point 7 thereon, whereupon, the opposite circuit being established, the armature again causes the release of the trip-lever and the piston continues its upward movement to the top of the cylinder. The tray $a$ is thus brought into contact with tappet $h^2$ and the tappet-rod rotates the valve-disks in the direction indicated by arrow 8 in Fig. 7 and restores them to the position therein shown, whereupon the water exhausts from the cylinder and air-chamber through pipe E and the piston descends again until it is arrested in its movement by the trip lever and pawl, as shown by full lines in Fig. 1. Such operation will continue as long as the furnace is kept supplied with fuel, the apparatus, in connection with the thermostat, automatically regulating the temperature.

The function of air-chamber B' is to supplement the pressure of the water from the street-main when said pressure is cut off by the last-described movement of the valve and insure the movement of the piston to the top of the cylinder. As soon as tray $a$ begins to raise tappet $h^2$ and rod H, disk $C^4$ begins to rotate and to move port $c^5$ out of alignment with duct $c^8$, thus at once lessening the pressure of the water within the cylinder; but the decrease in pressure is instantly counterbalanced by the pressure of the air within the air-chamber, so that the piston is caused to complete its upward movement.

It will be observed that in the apparatus thus described the valve is positively operated by the piston, instead of by magnets, as in my former apparatus, and that the sole office of the magnet in my present invention is to operate the pawl which engages the trip-lever. I thus simplify the mechanism for electrically controlling the operation of the apparatus and lessen the liability of accidental irregularity in the operation of the apparatus itself.

The time mechanism shown and described in my Letters Patent referred to, by which the operation of the apparatus can be suspended and caused to be automatically resumed at any predetermined time, can be used equally well with my present apparatus, as will be obvious from an inspection of said Letters Patent.

I do not wish to limit myself to the exact details of construction herein shown and described, inasmuch as various modifications therein can be made within the spirit of my invention.

Having thus fully described my invention, what I claim, and desire to secure by Letters Patent, is—

1. In an apparatus for regulating temperature, the combination of the following instrumentalities, viz: a cylinder containing a piston the stem of which is to be operatively connected with the draft-governing devices of a furnace, a valve operated by the movement of said piston governing the admission of fluid or liquid under pressure to and its exhaustion from said cylinder, a trip-lever and pawl for temporarily suspending the movement of the piston, an electric generator, a thermostat, an electro-magnet, and suitable conductors between said battery, thermostat, magnet, and pawl, whereby the latter will be operated to release the trip-lever by variations in the degree of temperature, substantially as set forth.

2. The apparatus for regulating temperature herein described, comprising, in combination with an electric battery, an electro-magnet, and a thermostat, a vertical cylinder containing a piston, a valve governing the admission of fluid or liquid under pressure to and its exhaustion from said cylinder, a rod operatively connected with the stem of said valve and extending upwardly in a plane parallel with the stem of said piston, stops located upon said rod adapted to be engaged by a contact device upon the piston-stem, a trip-lever located adjacent to the piston-stem and adapted to be engaged by stops upon the latter before the piston arrives at the end of its movement in either direction, a pivoted pawl having at one end an armature located within the field of the magnet and at its opposite end a notch to engage the end of said trip-lever, two contact-plates located adjacent to the valve-operating rod, a circuit-breaking device secured to said rod and adapted to pass from one of said plates to the other with the movement of said rod, a wire connecting each of said plates with one of the contact-points of the thermostat, a wire connecting the battery with the rod of the thermostat, a wire connecting the battery with the magnet, and a wire connecting the magnet with the circuit-breaking device on the valve-operating rod, arranged and operating substantially as and for the purpose described.

3. In an apparatus for regulating temperature, the combination, with cylinder A, containing piston A', of valve C, consisting of shell C', having seats $c$ $c'$ and ducts $c^7$ $c^8$ $d$ $e$, disks $C^3$ $C^4$, fitted to said seats and having ports $c^4$ $c^5$, respectively, pipe B, communicating with cylinder A and also with said valve by means of said ducts $c^7$ $c^8$, and pipes D E, communicating with said valve by means of ducts $d$ $e$, respectively, substantially as and for the purpose set forth.

4. In an apparatus for regulating temperature, cylinder A, containing piston A', valve C, supply-pipe D, and exhaust-pipe E, communicating with said valve, air-chamber B', and pipe B, communicating at one end with said air-chamber, at its opposite end with said valve, and between its ends with cylinder A, combined and operating substantially as described.

5. In an apparatus for regulating temperature, a vertical cylinder containing a piston the stem of which is to be operatively connected with the draft-governing devices of a furnace, in combination with valve C, consisting of shell C', having seats $c$ $c'$, disk $C^3$, fitted to said seat $c$ and having stem $C^5$, pins $c^2$, and port $c^4$, disk $C^4$, fitted to said seat $c'$ and having port $c^5$ and orifices $c^3$, pipe E, communicating by means of duct $e$ with the seat of disk $C^3$, pipe D, communicating by means of duct $d$ with the valve chamber above disk $C^4$, and pipe B, communicating by means of duct $c^7$ with said chamber between the disks and by means of branch duct $c^8$ with the seat of disk $C^4$, said pipe B also communicating with the cylinder, arranged and operating substantially in the manner described.

6. In an apparatus for regulating temperature, cylinder A, piston A', having stem $A^2$, provided with a contact device, $a$, valve C, having disks $c^3$ $c^4$, operated by stem $C^5$, pipes D E, communicating with said valve, pipe B, connecting said valve with the cylinder, arm F, secured to said stem $C^5$, lever G, engaging said arm at one end, and rod H, connected to the opposite end of said lever, said rod having adjustably secured thereon tappets $h^2$ $h^3$, lying within the plane of the movement of the contact device on the piston-stem, whereby the valve-disks are operated by said piston-stem, substantially as set forth.

7. As a means for electrically controlling the apparatus for regulating temperature herein described, the combination, with the cylinder, piston, valve, and tappet-rod for operating said valve, arranged and operating substantially as described, of trip-lever M, pivoted to bracket $h'$ and loosely embracing the piston-stem between stops on the latter, pawl O, having notch $o$ at its upper end and armature $o'$ at its lower end, an electric battery, as I, a thermostat, as K, having the contact-points 6 7 thereon, an electro-magnet, as L, facing said armature $o'$, contact-plates $k$ $k'$, arm $h^4$, secured to the tappet-rod and having mounted thereon roll $h^5$, bearing upon said plates alternately as the tappet-rod is raised or lowered, wires connecting each of said plates with one of the points 6 7 of the thermostat, a wire connecting the apparatus with the magnet, and wires connecting the battery with the magnet and also with the rod of the thermostat, substantially as and for the purpose set forth.

CHARLES W. JOHNSON.

Witnesses:
W. H. CHAPMAN,
T. M. BROWN.